(12) United States Patent
Nakamichi

(10) Patent No.: US 11,971,552 B2
(45) Date of Patent: Apr. 30, 2024

(54) ELECTRONIC DEVICE, METHOD OF CONTROLLING THE SAME, AND STORAGE MEDIUM

(71) Applicant: CANON KABUSHIKI KAISHA, Tokyo (JP)

(72) Inventor: Saki Nakamichi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/050,916

(22) Filed: Oct. 28, 2022

(65) Prior Publication Data
US 2023/0148300 A1 May 11, 2023

(30) Foreign Application Priority Data
Nov. 5, 2021 (JP) ................................. 2021-181436

(51) Int. Cl.
*G02B 13/24* (2006.01)
*G02B 27/01* (2006.01)

(52) U.S. Cl.
CPC ......... *G02B 27/0172* (2013.01); *G02B 13/24* (2013.01)

(58) Field of Classification Search
CPC .... G02B 27/0172; G02B 13/24; H04N 23/63; H04N 23/611; G03B 13/10; G03B 13/14; G03B 13/04; G03B 13/06; G06F 3/013; G06F 3/0484; G06F 3/14
See application file for complete search history.

(56) References Cited

U.S. PATENT DOCUMENTS

| 5,703,605 A | * | 12/1997 | Takahashi | .......... G02B 27/0172 359/630 |
| 6,816,313 B2 | | 11/2004 | Hara | |
| 2016/0116740 A1 | * | 4/2016 | Takahashi | ............ G02B 27/017 345/8 |
| 2017/0104900 A1 | * | 4/2017 | Kitaya | ...................... G06T 7/11 |

FOREIGN PATENT DOCUMENTS

| EP | 3771967 A2 | 2/2021 |
| JP | 2010-016669 A | 1/2010 |

* cited by examiner

*Primary Examiner* — Towfiq Elahi
(74) *Attorney, Agent, or Firm* — Canon U.S.A., Inc. I.P. Division

(57) ABSTRACT

An electronic device comprises a display configured to display an image, an ocular optical system for viewing the display, and a control unit configured to control the display unit so as to change a display area of the display based on a distance from the ocular optical system to an eye of a user looking into the ocular optical system.

14 Claims, 15 Drawing Sheets

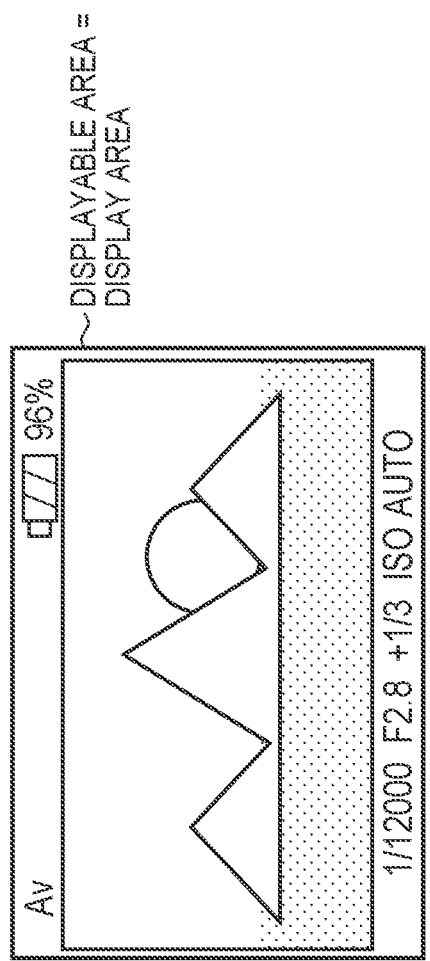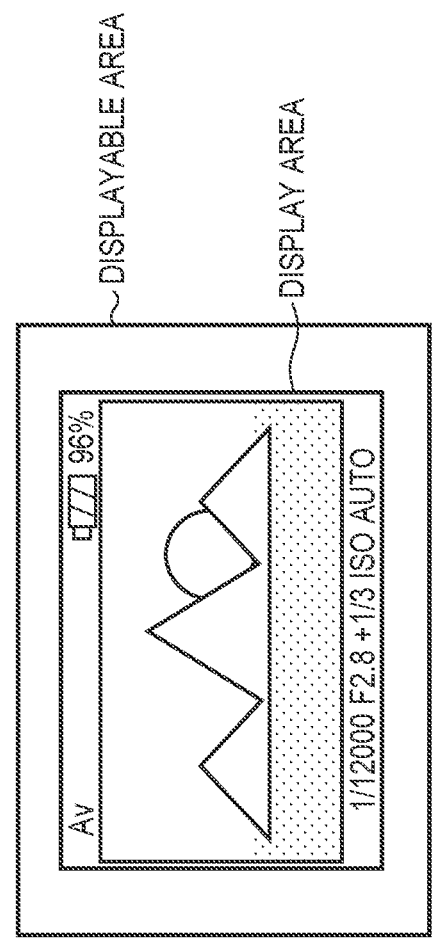

F I G. 11A
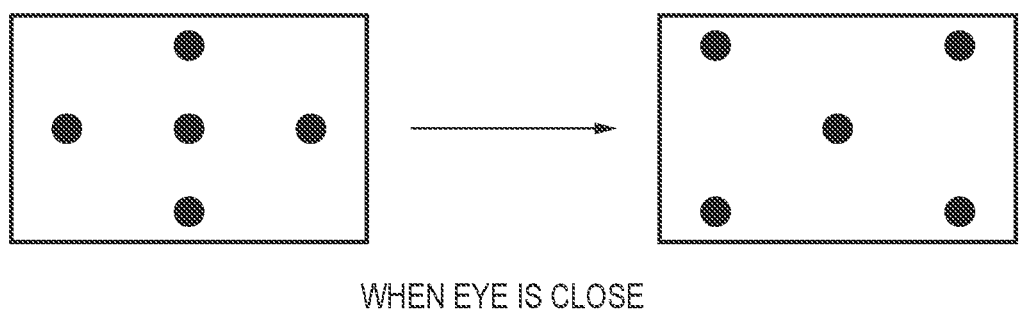
WHEN EYE IS CLOSE
F I G. 11B
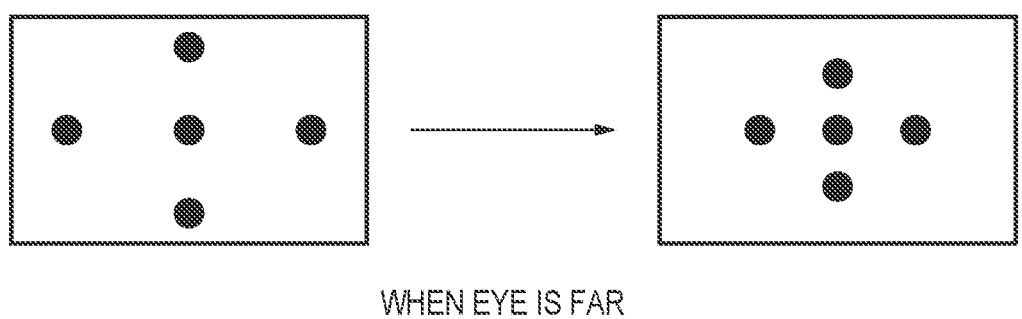
WHEN EYE IS FAR

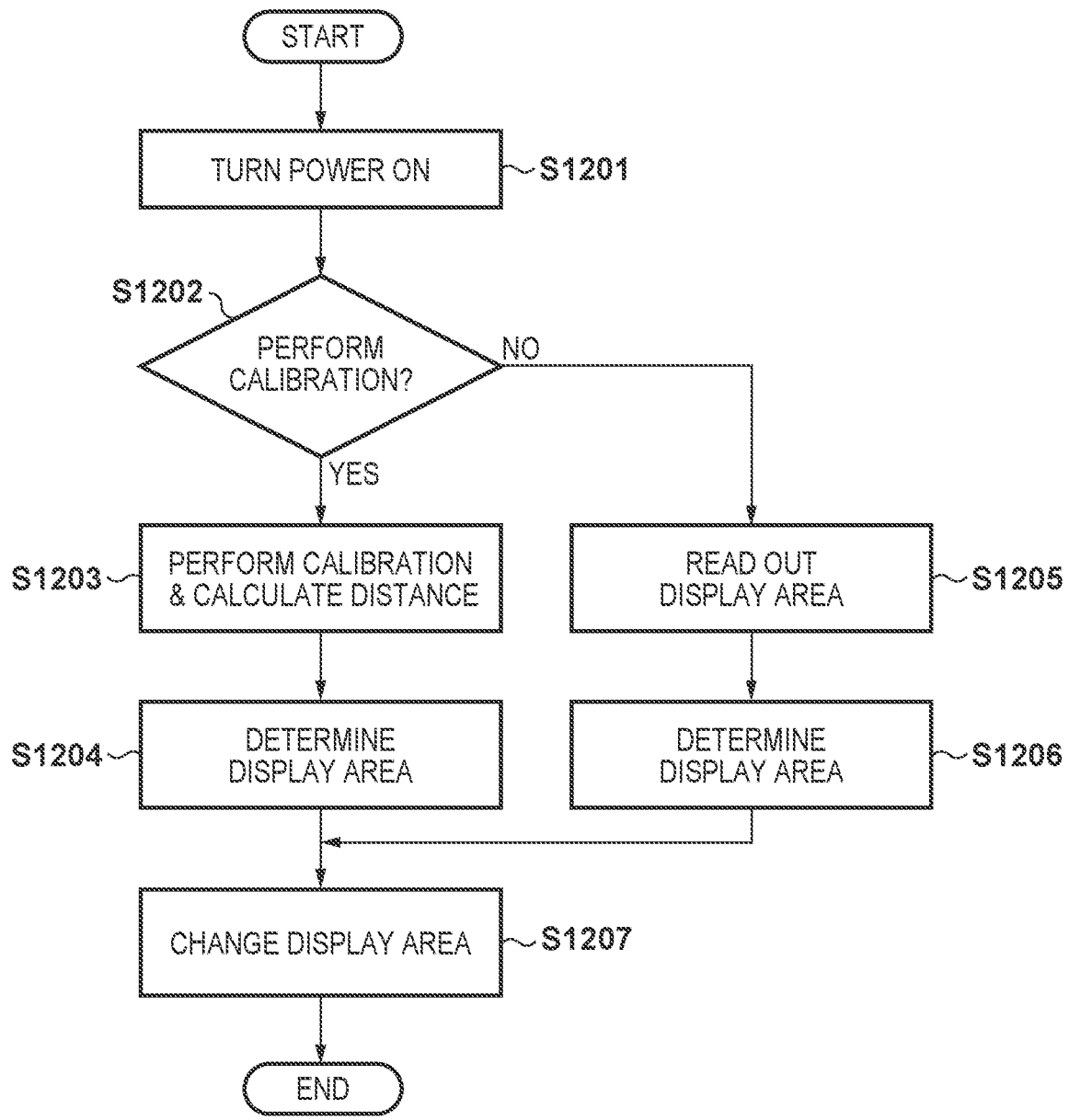

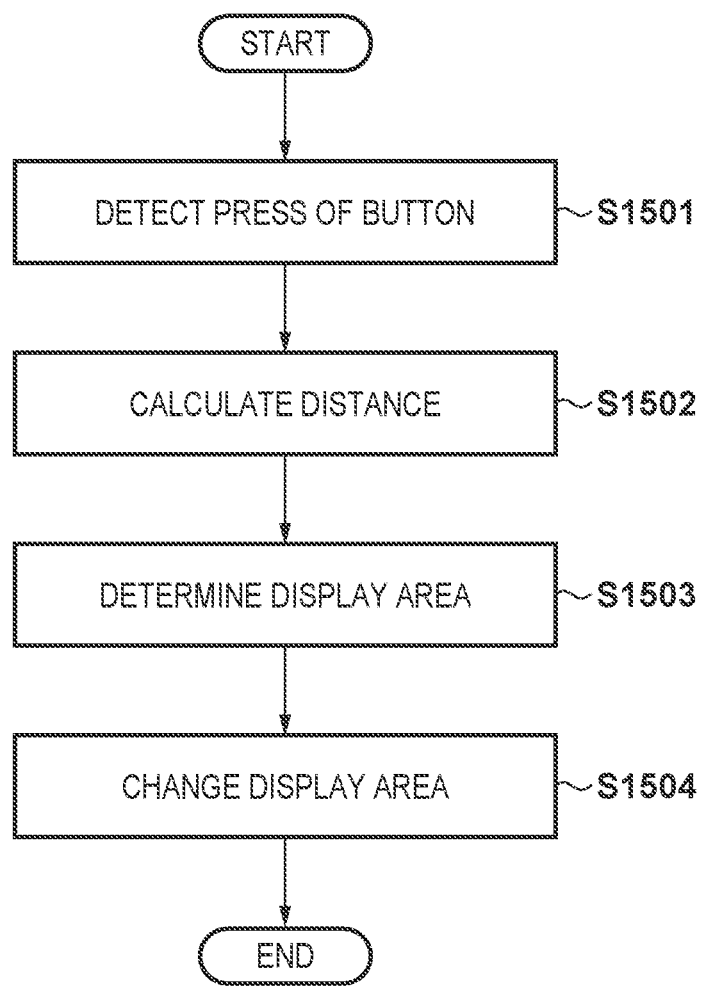

ELECTRONIC DEVICE, METHOD OF CONTROLLING THE SAME, AND STORAGE MEDIUM

BACKGROUND OF THE INVENTION

Field of the Invention

The present invention relates to a technique for changing a display area of a display provided in an electronic device.

Description of the Related Art

Some models of image capturing devices, such as a digital camera and a video camera, use an electronic viewfinder (EVF) for visually confirming a subject. The electronic viewfinder is configured so that a small display provided inside the camera can be viewed magnified through an ocular optical system configured by a plurality of lenses. A user can view a magnified display image by looking into this ocular optical system.

Recently, there has been a trend of desiring a higher display magnification for viewfinders of cameras. The higher the magnification, the bigger the image can be seen, so it has the merit that it is easier to confirm focus. In addition, the user feels more immersed with a viewfinder with a large field of view, which makes it more fun to capture images.

However, when a distance from the viewfinder to the eye increases (e.g., when the user looks into the viewfinder while wearing glasses, and the like), if the display area is too large, there will be a problem that a portion of the display area will be shielded, resulting in poorer visibility and making framing more difficult.

As one countermeasure for this problem, Japanese Patent Laid-Open No. 2010-016669 discloses a technique that allows a user to arbitrarily set the display area of the viewfinder.

However, in the prior art disclosed in Japanese Patent Laid-Open No. 2010-01666, when changing the display area of the viewfinder, it is necessary to operate from a hierarchical menu. Therefore, there is a problem that an operation for changing the display area is cumbersome for users who, at times, capture images while wearing glasses and, at other times, capture images without wearing glasses.

SUMMARY OF THE INVENTION

The present invention has been made in view of the problems described above and provides an electronic device capable of displaying an image in a display area of an appropriate size for a user.

According to a first aspect of the present invention, there is provided an electronic device comprising: a display configured to display an image; an ocular optical system configured to view the display; and at least one processor or circuit configured to function as a control unit configured to control the display so as to change a display area of the display based on a distance from the ocular optical system to an eye of a user looking into the ocular optical system.

According to a second aspect of the present invention, there is provided a method of controlling an electronic device including a display configured to display an image and an ocular optical system configured to view the display, the method comprising: controlling the display so as to change a display area of the display based on a distance from the ocular optical system to an eye of a user looking into the ocular optical system.

According to a third aspect of the present invention, there is provided a non-transitory computer-readable storage medium storing a program for causing a computer to execute the method of controlling an electronic device including a display configured to display an image and an ocular optical system configured to view the display, the method comprising: controlling the display so as to change a display area of the display based on a distance from the ocular optical system to an eye of a user looking into the ocular optical system.

Further features of the present invention will become apparent from the following description of exemplary embodiments with reference to the attached drawings.

BRIEF DESCRIPTION OF THE DRAWINGS

FIGS. 10A and 10B are schematic diagrams illustrating how to change a display area of a display device.

FIGS. 11A and 11B are schematic diagrams illustrating changing a display of targets used for calibration based on the distance from the final surface of the ocular optical system to an eye.

FIG. 12 is a flowchart for explaining an operation for changing the display area of the display device.

FIG. 15 is a flowchart for explaining an operation for changing the display area of the display device in a fourth embodiment.

DESCRIPTION OF THE EMBODIMENTS

Figure 1A:
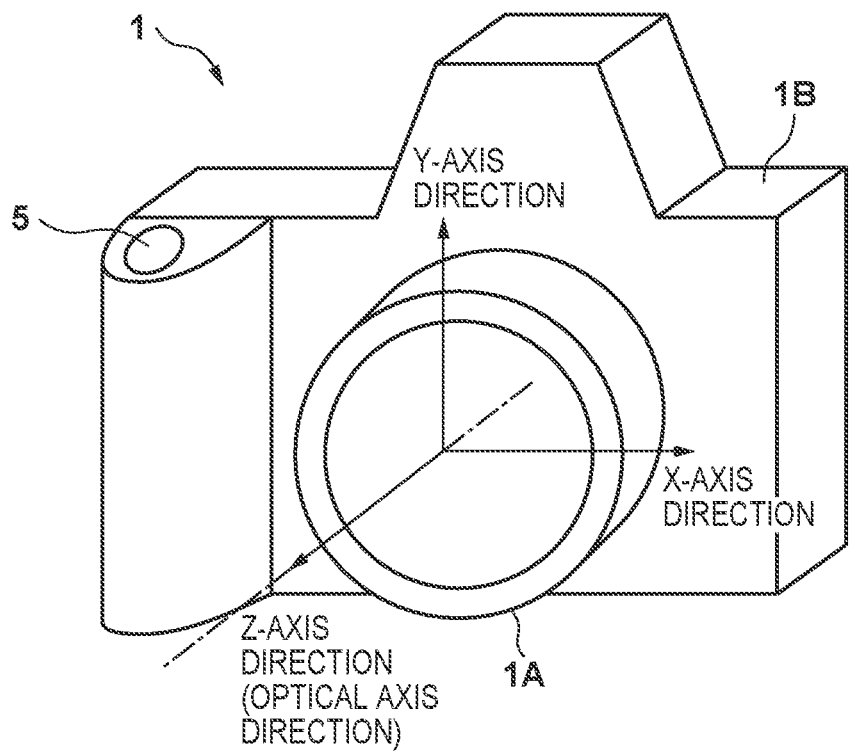
FIGS. 1A and 1B are diagrams illustrating an external appearance of a digital, interchangeable-lens camera, which is a first embodiment of an electronic device of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Description of Configuration>

Figure 1B:
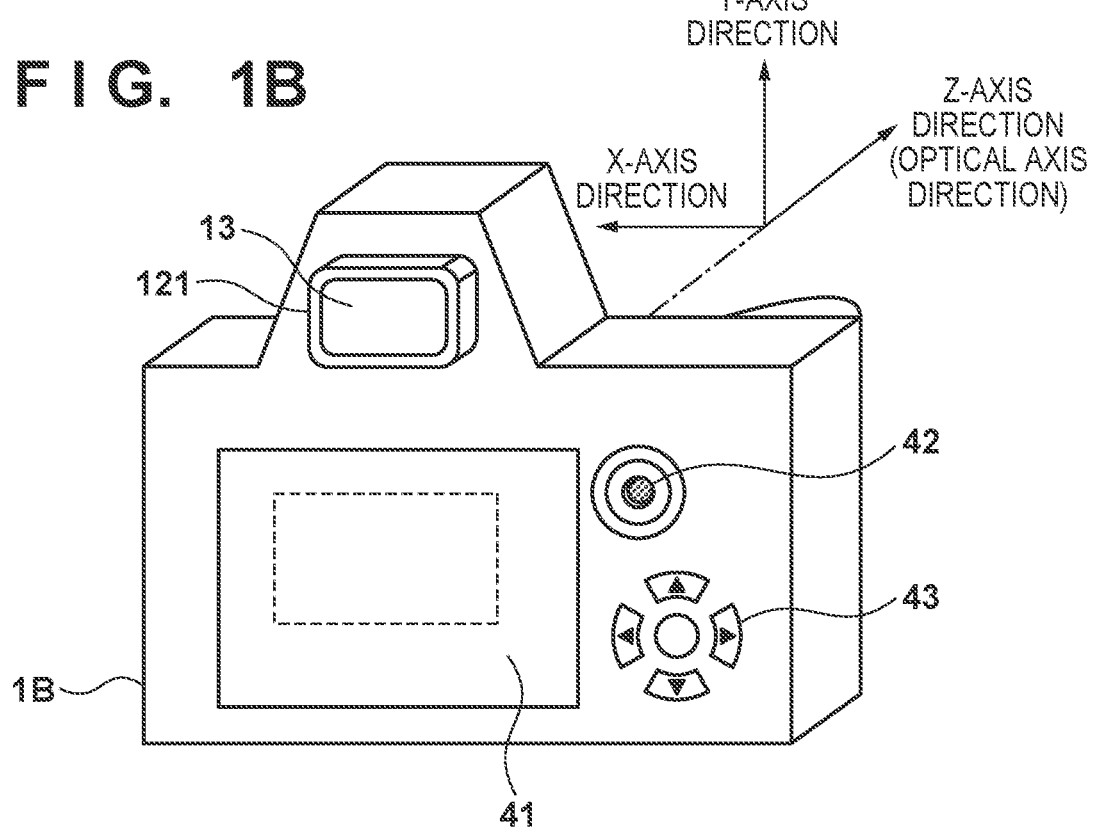

FIGS. 1A and 1B are diagrams illustrating an external appearance of a digital, interchangeable-lens camera 1 (hereinafter, the camera), which is a first embodiment of an electronic device of the present invention. The electronic device referred to in the present invention is not limited to a digital camera and encompasses devices for displaying information, such as images and text, and any electronic device capable of detecting a line-of-sight of a user viewing an optical image through an ocular optical system. These electronic devices may include, for example, mobile phones, game machines, tablet terminals, personal computers, watch and eyewear-type information terminals, head-mounted displays, binoculars, and the like.

FIG. 1A is a front perspective view of the camera 1, and FIG. 1B is a rear perspective view of the camera 1.

As illustrated in FIG. 1A, the camera 1 includes an image capturing lens unit 1A and a camera body 1B. The camera body 1B is provided with a release button 5, which is an operation member for receiving an image capturing operation from a user (photographer). As illustrated in FIG. 1B, the back of the camera body 1B is provided with an ocular window frame 121, which the user looks through to view a display device 6, which is included in the camera body 1B and will be described later (see FIG. 3).

A display unit in the present embodiment includes the display device 6. The ocular window frame 121 forms a viewing port 13 and protrudes outward (from the back side) with respect to the camera body 1B. The back of the camera body 1B is also provided with operation members 41 to 43 for receiving various operations from the user. For example, the operation member 41 is a touch panel that accepts a touch operation of the user, the operation member 42 is an operation lever that can be pushed down in respective directions, and the operation member 43 is a four-direction key that can be pushed in each of the four directions. The operation member 41 (touch panel) is provided with a display panel 40, such as a liquid crystal panel (see FIG. 3), and includes a function of displaying an image.

Figure 2:
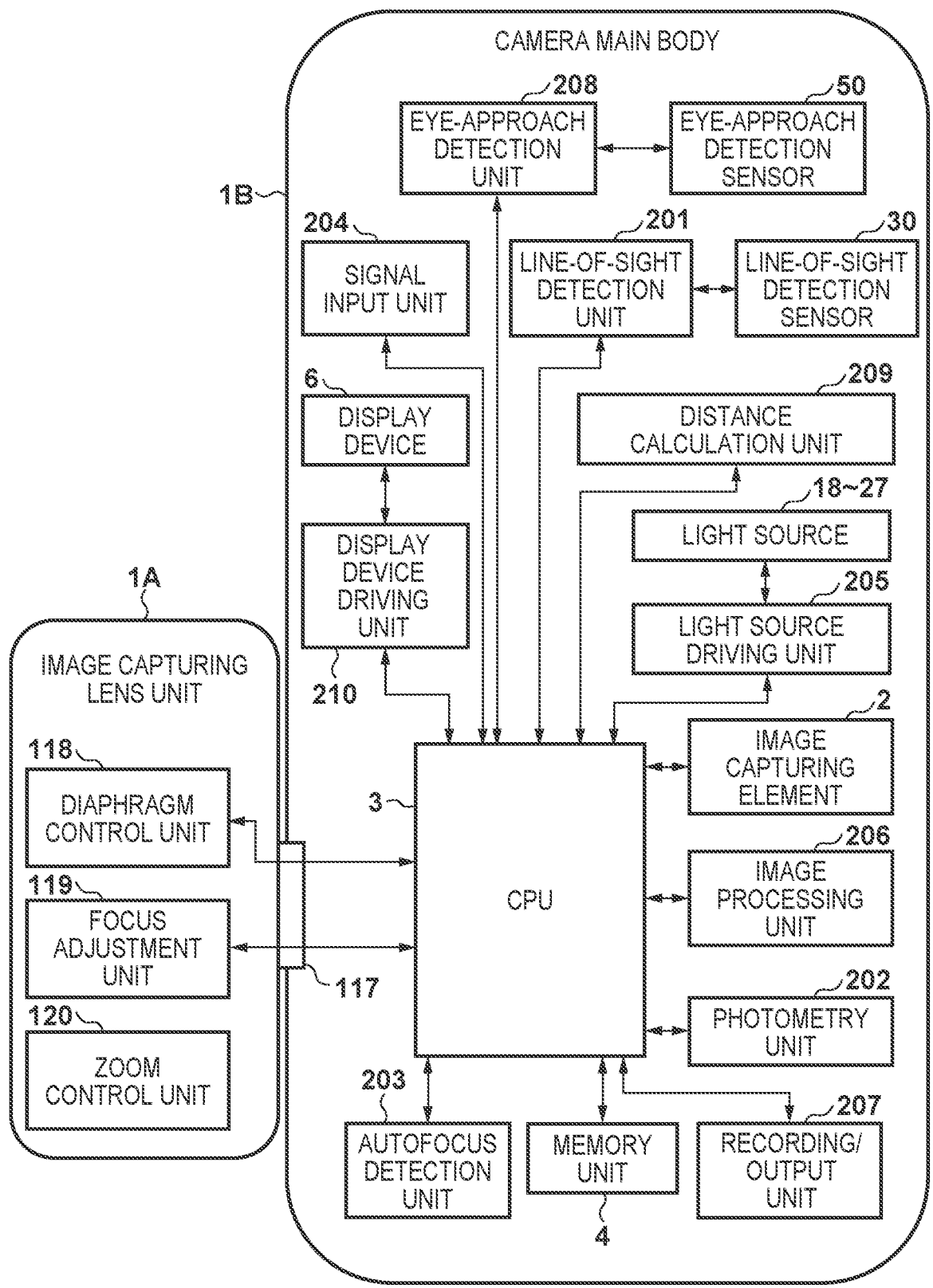
FIG. 2 is a cross-sectional view of the camera of the first embodiment.

FIG. 2 is a cross-sectional side view of the camera 1 of the present embodiment and is a diagram illustrating an electrical block configuration in the camera 1. The camera body 1B includes an image capturing element 2 for capturing a subject image. The image capturing element 2 is an image capturing element configured by, for example, a CCD or CMOS sensor or the like; an optical image formed on an image capturing plane of the image capturing element 2 by an optical system of the image capturing lens unit 1A is photoelectrically converted, and an obtained analog image signal is A/D-converted and outputted as image data.

The image capturing lens unit 1A is configured to include an optical system that includes a zoom lens, a focus lens, a diaphragm, and the like and, when mounted on the camera body 1B, guides a light beam from a subject to the image capturing element 2, thereby forming an image of the subject on an image capturing plane of the image capturing element 2. A diaphragm control unit 118, a focus adjustment unit 119, and a zoom control unit 120 each receive an instruction signal from a CPU 3 through a mount contact unit 117 and drive and control the diaphragm, the focus lens, and the zoom lens, respectively, in accordance with the instruction signal.

The CPU 3 provided in the camera body 1B reads control programs for the respective blocks provided in the camera body 1B from a ROM included in a memory unit 4, deploys these in a RAM included in the memory unit 4, and executes these. Thus, the CPU 3 controls the operation of the respective blocks provided in the camera body 1B. The CPU 3 is connected to a line-of-sight detection unit 201, a photometry unit 202, an autofocus detection unit 203, a signal input unit 204, an eye-approach detection unit 208, a distance calculation unit 209, a display device driving unit 210, a light source driving unit 205, and the like. Further, the CPU 3 transmits a signal to the diaphragm control unit 118, the focus adjustment unit 119, and the zoom control unit 120 provided in the image capturing lens unit 1A through a mount contact point 117. In the present embodiment, the memory unit 4 includes a function of storing image capturing signals from the image capturing element 2 and a line-of-sight detection sensor 30.

In a state in which an image of an eyeball is formed on the line-of-sight detection sensor 30 (CCD-EYE), the line-of-sight detection unit 201 performs A/D conversion of an output (an image of an eye in which the eyeball is captured) of the line-of-sight detection sensor 30 and transmits that result to the CPU 3. The CPU 3 extracts feature points necessary for detecting a line of sight from the image of the eye in accordance with a predetermined algorithm, which will be described later, and calculates a line of sight (a gaze point in an image for visual confirmation) of the user from positions of the feature points.

Figure 9:
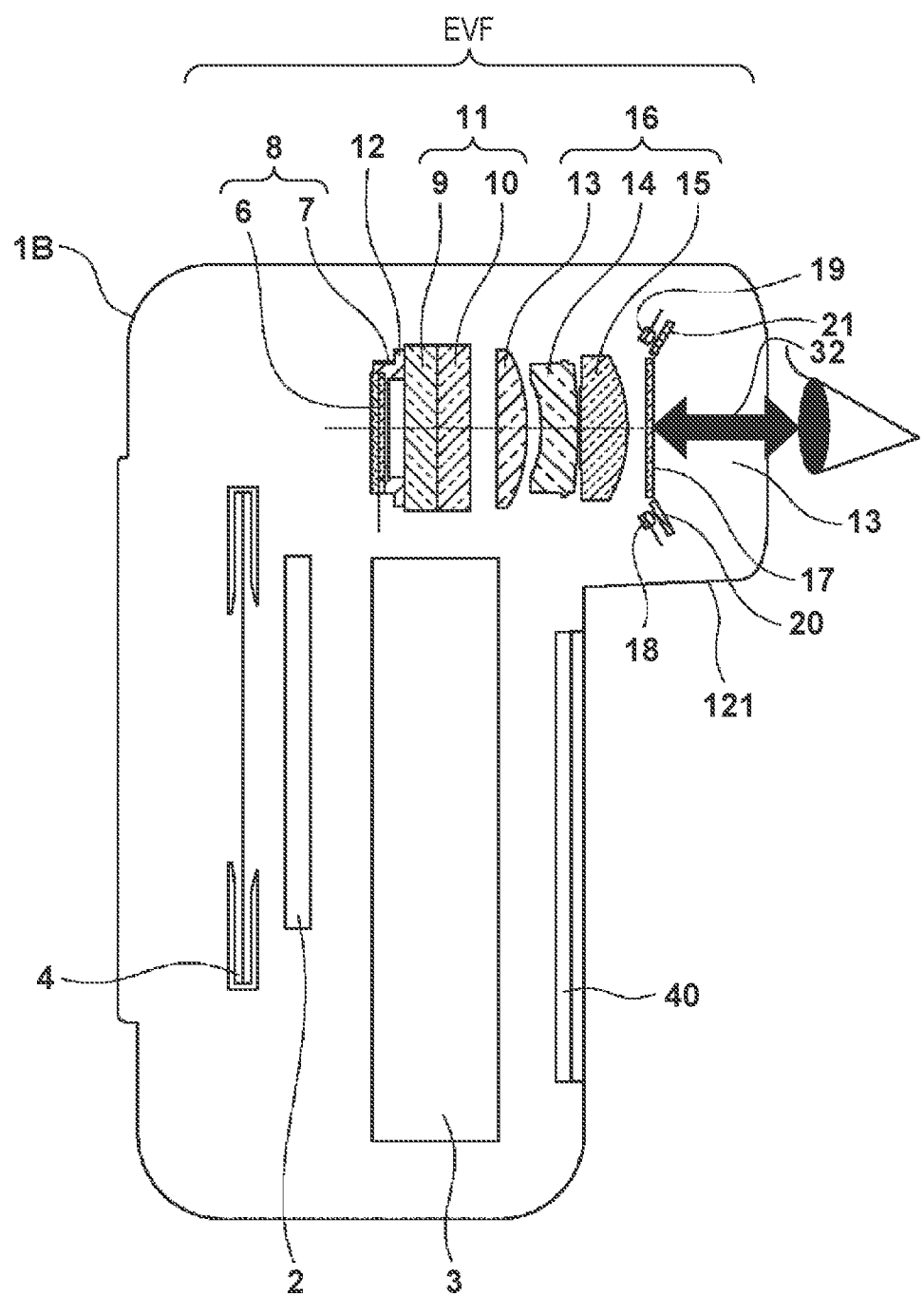
FIG. 9 is a schematic diagram illustrating a distance from the final surface of an ocular optical system to an eye.

Further, the distance calculation unit 209 calculates a distance 32 from the final surface of an ocular optical system 16, which is illustrated in FIG. 9, to the eye. The distance calculation unit 209 calculates the distance 32 from the final surface of the ocular optical system 16 to the eye based on coordinates of cornea-reflected images on the line-of-sight detection sensor 30 and transmits an output value to the CPU 3. The distance calculation unit 209 may obtain the distance 32 from a table or the like in which the distance 32 from the final surface of the ocular optical system 16 to the eye has been calculated in advance based on the coordinates of the cornea-reflected images.

The display device driving unit 210 determines the display area of the display device 6 based on the distance calculated by the distance calculation unit 209 and performs display. The eye-approach detection unit 208 transmits an output of an eye-approach detection sensor 50 to the CPU 3. The CPU 3 calculates whether or not the user's eye has approached in accordance with a predetermined algorithm, which will be described later. The light source driving unit 205 drives infrared LEDs 18 to 27, which are light sources, to be at a predetermined emission intensity in accordance with commands from the CPU 3.

The photometry unit 202 performs amplification, logarithmic compression, A/D conversion and the like of a signal (more specifically, a luminance signal, which corresponds to the brightness of a field of view) obtained from the image capturing element 2, which also serves as a photometric sensor, and transmits that result to the CPU 3 as field-of-view luminance information.

The autofocus detection unit 203 A/D-converts signal voltages from a plurality of detection elements (a plurality of sub-pixels), which are included in the pixels in the image capturing element 2 and are used for detecting a phase difference, and transmits them to the CPU 3. The CPU 3 calculates, from signals of the plurality of detection elements, a distance to a subject corresponding to each focus detection point. This is a known technique, which is known as image plane phase difference AF. In the present embodiment, as an example, it is assumed that an image of a field of view (image for visual confirmation) in the viewfinder is divided and that there is a focus detection point at each of 180 locations, which have been obtained by division, on the image capturing plane.

The image processing unit 206 performs various kinds of image processing on image data stored in the RAM in the memory unit 4. Specifically, various image processes for developing, displaying, and recording digital image data are performed, such as defect correction processing of pixels caused by an optical system or an image capturing element, demosaicing processing, white balance correction processing, color interpolation processing, and gamma processing, for example.

A switch SW1, which turns ON at a first stroke of the release button 5 and is for starting the camera 1's photometry, focus detection, and line-of-sight detection operations and the like, and a switch SW2, which turns ON at a second stroke of the release button 5 and is for starting an image capturing operation are connected to the signal input unit 204. An ON signal is inputted from the switch SW1 or SW2 to the signal input unit 204 and is then transmitted to the CPU 3. The signal input unit 204 also receives operation inputs from the operation members 41 (a touch panel), 42 (a button), and 43 (arrow keys) illustrated in FIG. 1B.

A recording/output unit 207 records data, which includes image data, on a storage medium, such as a removable memory card, or outputs the data to an external device via an external interface.

Figure 3:
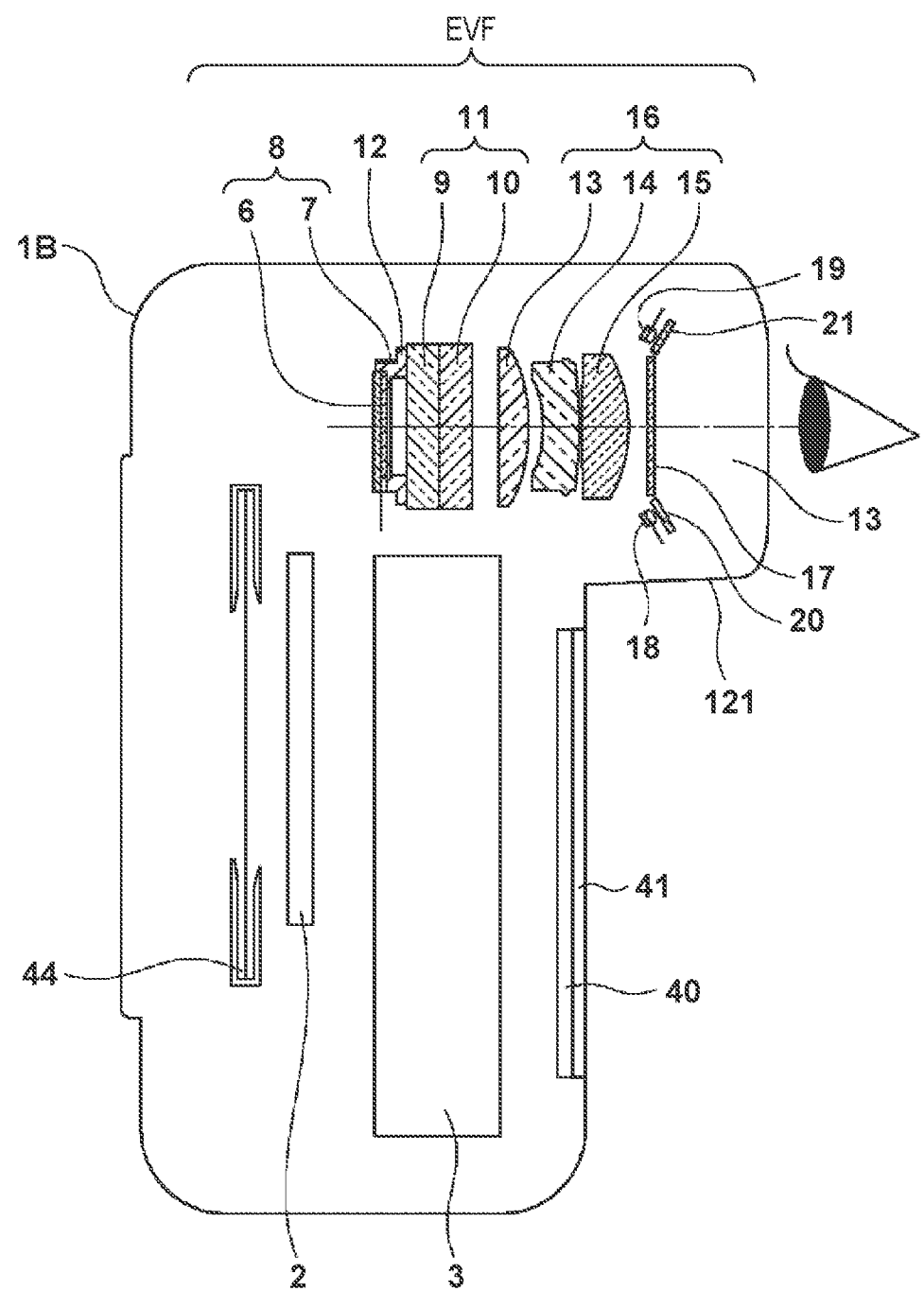
FIG. 3 is a cross-sectional view of an optical system that includes a line-of-sight detection mechanism.

FIG. 3 is a cross-sectional view of an optical system that includes a line-of-sight detection mechanism of the present embodiment and is a diagram obtained by cutting the camera 1 across a YZ plane, which is formed by a Y-axis and a Z-axis illustrated in FIG. 1A.

A shutter 44 and the image capturing element 2 are arranged in order in an optical axis direction of the image capturing lens unit 1A. The back of the camera body 1B is provided with the display panel 40, which is used for operating the camera 1, displaying menus for viewing and editing images obtained with the camera 1, and displaying images. The display panel 40 is configured by a liquid crystal panel with a backlight, an organic EL panel, or the like.

A panel holder 7 is a panel holder for holding the display device 6 configured by an organic EL panel or the like, is bonded and fixed to the display device 6, and configures a display panel unit 8.

A first optical path splitting prism 9 and a second optical path splitting prism 10 are bonded by adhesion to configure an optical path splitting prism unit 11 (optical path splitting member). The optical path splitting prism unit 11 guides a light beam from the display device 6 to an eyepiece window 17 provided in the user's viewing port 13 and, conversely, guides, to the line-of-sight detection sensor 30 illustrated in FIGS. 4A and 4B, light reflected from an eye (pupil) and the like and guided from the eyepiece window 17. The display panel unit 8 and the optical path splitting prism unit 11 are fixed with a mask 12 therebetween and are formed into a unit.

The ocular optical system 16 is configured by a G1 lens 13, a G2 lens 14, and a G3 lens 15. The electronic viewfinder is configured such that the display panel unit 8 is seen magnified through the ocular optical system 16 so that the user can view a magnified display image.

The eyepiece window 17 is a transparent member that transmits visible light. An image displayed on the display panel unit 8 is viewed through the optical path splitting prism unit 11, the ocular optical system 16, and the eyepiece window 17.

Illumination windows 20 and 21 are windows for hiding the infrared LEDs 18 and 19 so as not to be visible from the outside and are configured by resin that absorbs visible light and transmits infrared light.

In addition to being able to display menus and images similarly to the display panel 40 as a typical electronic viewfinder (EVF), the EVF provided in the camera body 1B in the present embodiment is configured so as to be able to detect a line of sight of the user looking at the EVF and reflect a result of the detection in the control of the camera 1.

Similarly to the display panel 40, when the user is looking through the viewfinder, the display device 6 is used to display menus for operating the camera 1 and viewing and editing images obtained by the camera 1 and display images. The display device 6 is configured by a liquid crystal panel with a backlight, an organic EL panel, or the like.

Figure 4A:
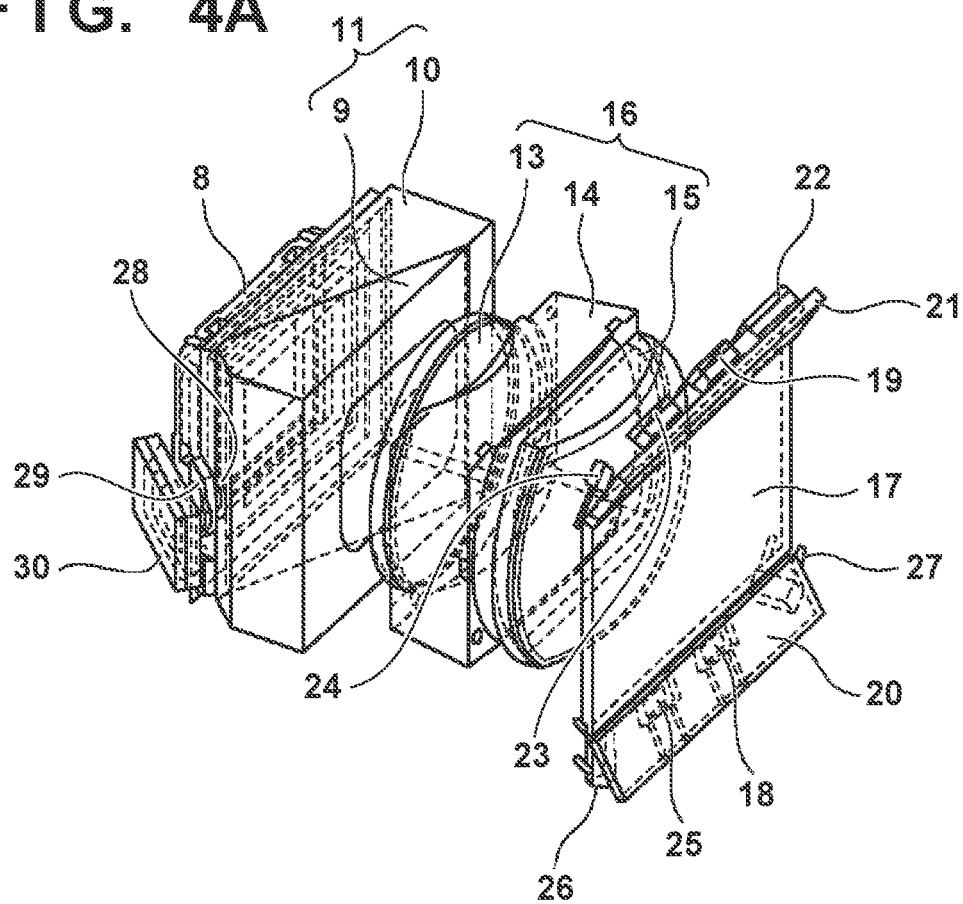
FIGS. 4A and 4B are perspective views of the optical system that includes the line-of-sight detection mechanism.
Figure 4B:
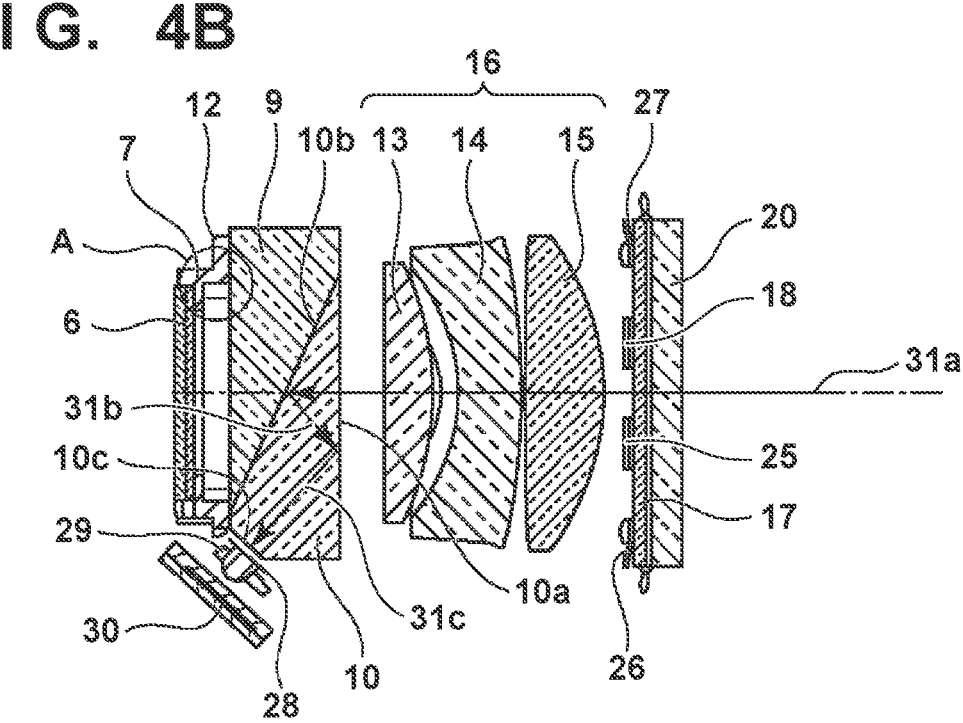

FIGS. 4A and 4B are a perspective view and a cross-sectional view of an optical system that includes a line-of-sight detection mechanism of the present embodiment. FIG. 4A is a perspective view illustrating a configuration of the EVF in the present embodiment, and FIG. 4B is a cross-sectional side view of an optical axis of the EVF.

The eyepiece window 17 is a transparent member that transmits visible light. An image displayed on the display panel 6 is viewed through the optical path splitting prism unit 11, the ocular optical system 16, and the eyepiece window 17.

The infrared LEDs 18, 19, 22, 23, 24, 25, 26, and 27 are arranged so as to irradiate infrared light toward the user's viewing port 13 from different positions and orientations. The illumination windows 20 and 21 are windows for hiding the infrared LEDs 18, 19, 22, 23, 24, 25, 26, and 27 so as not to be visible from the outside and are configured by resin that absorbs visible light and transmits infrared light.

The infrared LED 18, 19, 23, and 25 are infrared LEDs for close-range illumination. The infrared LED 22, 24, 26, and 27 are infrared LEDs for long-range illumination. A line-of-sight detection optical system, which includes a diaphragm 28 and a line-of-sight image forming lens 29, further guides reflected infrared light guided from the eyepiece window 17 by the optical path splitting prism unit 11 to the line-of-sight detection sensor 30. The line-of-sight detection sensor 30 is configured by a solid-state image capturing element, such as a CCD or CMOS sensor.

The eye-approach detection sensor 50 is configured by a photodiode, which can be driven at a power that is lower than the line-of-sight detection sensor 30, and the like. The infrared LED 22 for detecting a line of sight is also used as an infrared LED for detecting the approach of the eye. The infrared LED 22 illuminates the user's eye, and the eye-approach detection sensor 50 receives light diffusely reflected off the user.

In FIG. 4B, an image of an eyeball, which has been illuminated by infrared LEDs, of the user looking through the eyepiece window 17 enters the second optical path splitting prism 10 from a second surface 10a through the G3 lens 15, the G2 lens 14, and the G1 lens 13. This optical path is indicated by 31a. On a first surface 10b of the second optical path splitting prism is formed a dichroic film for reflecting infrared light.

An image of an eyeball illuminated by at least one of the infrared LEDs illustrated in FIG. 4A is reflected by the first surface 10b toward the second surface 10a. This reflected light path is indicated by 31b. The infrared light that has passed the reflected light path 31b is totally reflected by the second surface 10a, passes an image forming light path 31c, and is formed into an image on the line-of-sight detection sensor 30 by the line-of-sight image forming lens 29 through the diaphragm 28.

Figure 5:
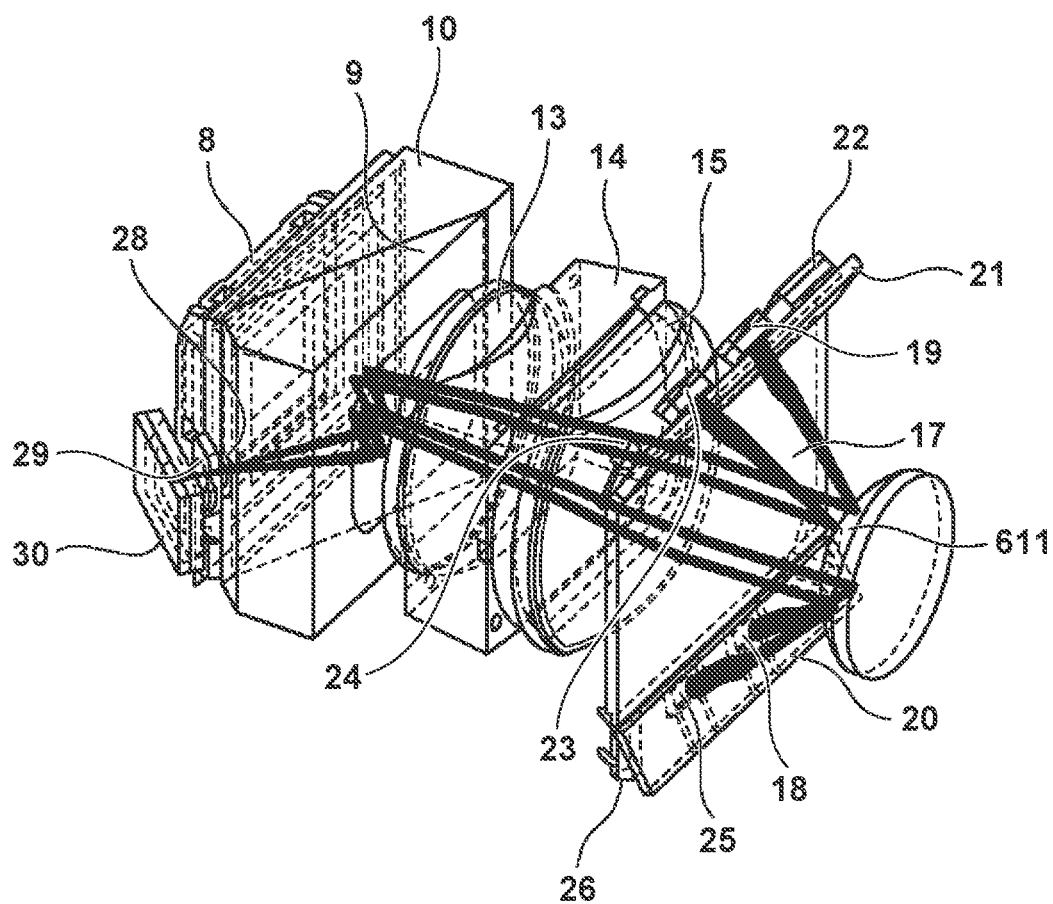
FIG. 5 is an optical path diagram for when detecting a line of sight using the line-of-sight detection mechanism.

To detect a line of sight, a cornea-reflected image formed by a specular reflection of infrared LED by the cornea is used in conjunction with an eyeball image by illumination. FIG. 5 illustrates an example of an optical path for light emitted from the infrared LEDs 18, 19, 23, and 25 for close-range illumination from when it is specularly reflected by a cornea 611 of an eyeball until it is received by the line-of-sight detection sensor 30.

<Description of Operation for Detecting Line of Sight>

A method of detecting a line of sight will be described with reference to FIGS. 6, 7A, 7B, and 8.

Figure 6:
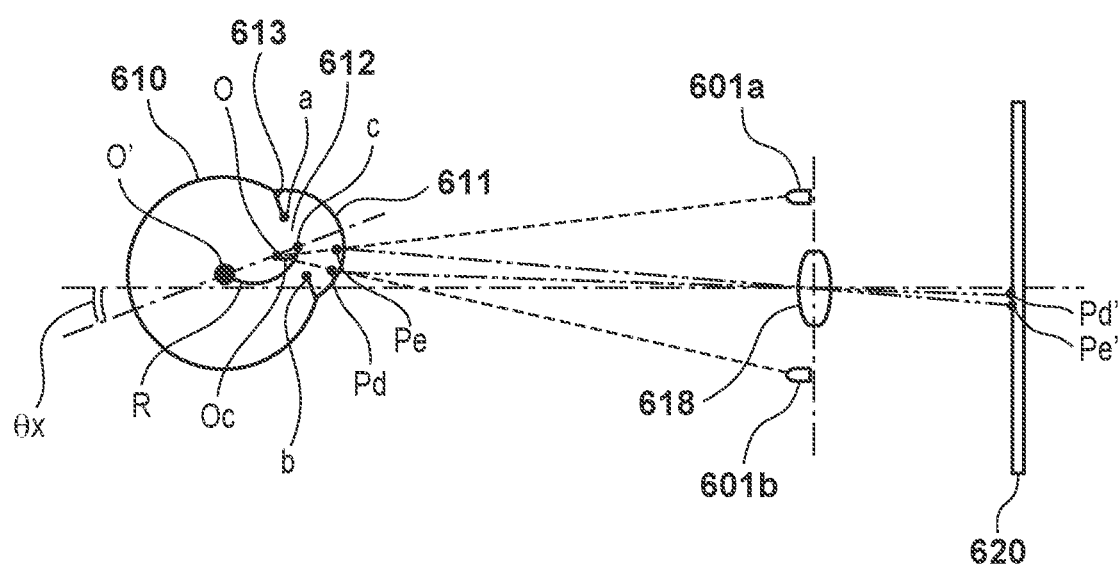
FIG. 6 is a schematic diagram for explaining principles of a method of detecting a field of view.

FIG. 6 is a diagram for explaining principles of a method of detecting a line of sight and is a schematic diagram of an optical system for performing line-of-sight detection.

As illustrated in FIG. 6, light sources 601a and 601b are arranged to be substantially symmetrical with respect to an optical axis of a light receiving lens 618 (corresponds to the line-of-sight image forming lens 29 in FIG. 4B) and illuminates the user's eyeball 610. Some of the light emitted from the light sources 601a and 601b and reflected by the eyeball 610 are focused on the line-of-sight detection sensor 620 (corresponds to the line-of-sight detection sensor 30 in FIGS. 4A, 4B, and 5) by the light receiving lens 618.

Figure 7A:
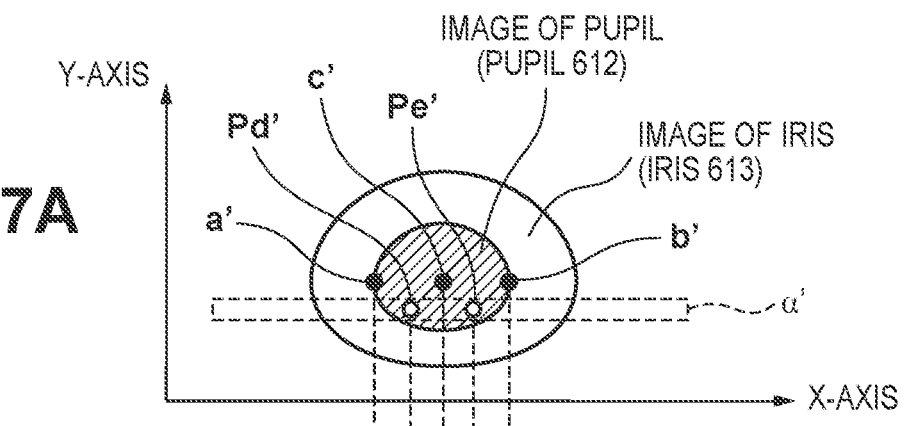
FIGS. 7A and 7B are schematic diagrams illustrating an image of an eye.
Figure 7B:
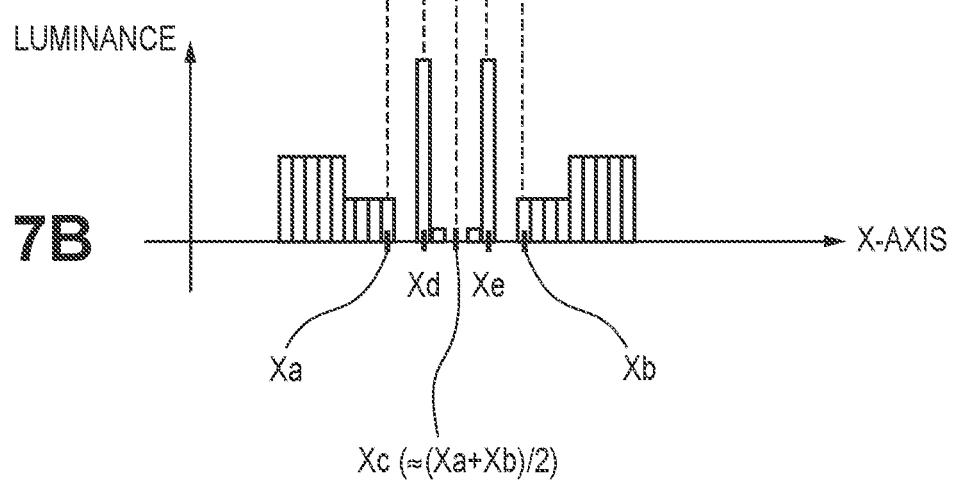
Figure 8:
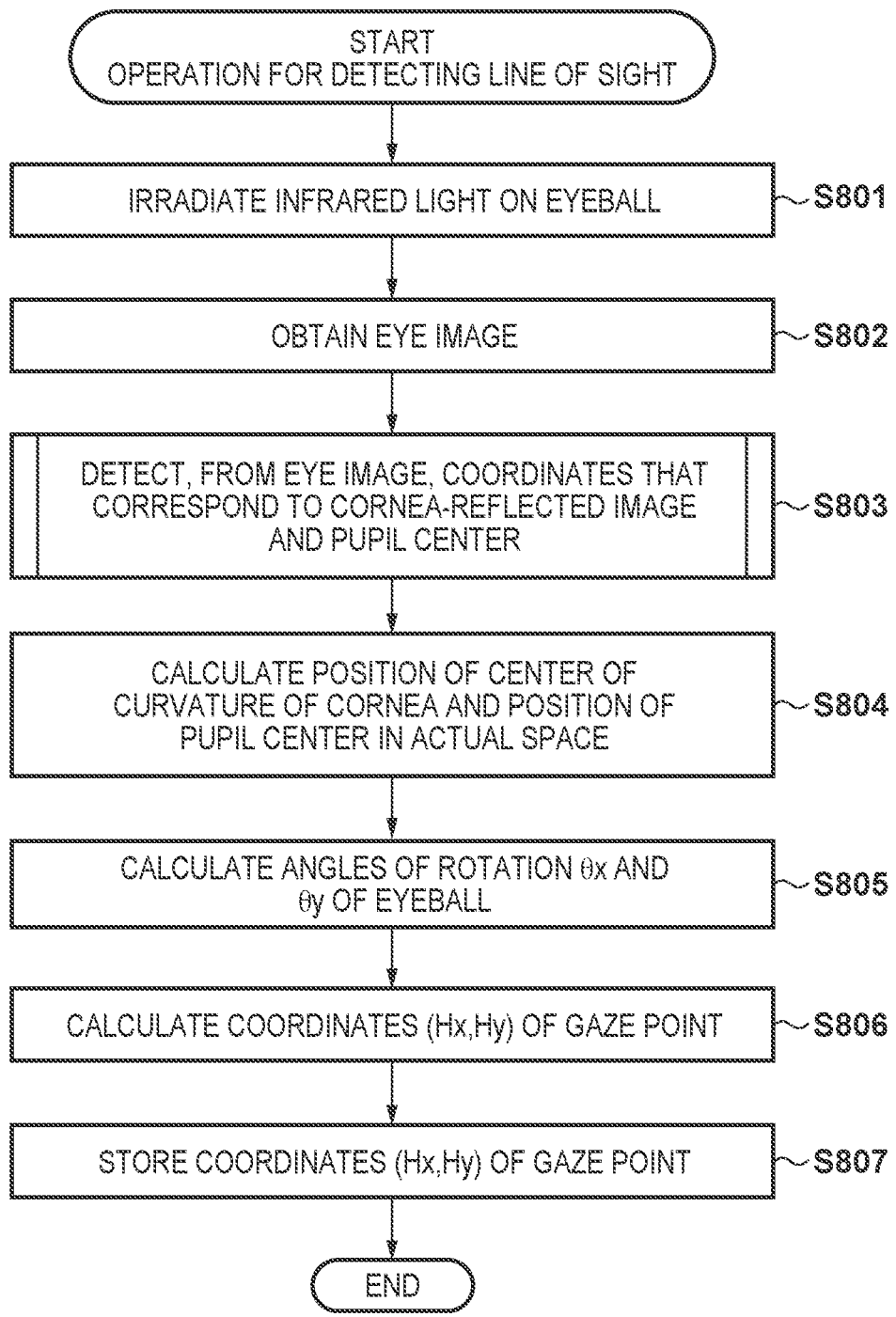
FIG. 8 is a flowchart for explaining an operation for detecting a line of sight.

FIG. 7A is a schematic diagram of an eye image captured by the line-of-sight detection sensor 620 (an eyeball image projected on the line-of-sight detection sensor 620), and FIG. 7B is a diagram illustrating an output intensity of the image capturing element in the line-of-sight detection sensor 620. FIG. 8 indicates a schematic flowchart of an operation for detecting a line of sight.

When an operation for detecting a line of sight is started, in step S801 of FIG. 8, the CPU 3 causes the light sources 601a and 601b to emit light, irradiating infrared light of an emission intensity E2 for line-of-sight detection toward the user's eyeball 610. An image of the user's eyeball illuminated by the infrared light is formed on the line-of-sight detection sensor 620 through the light receiving lens 618 and is photoelectrically converted by the line-of-sight detection sensor 620. By this, a processable electrical signal of an eye image is obtained.

In step S802, the CPU 3 obtains the eye image (an eye image signal; an electrical signal of the eye image) from the line-of-sight detection sensor 620 using the line-of-sight detection unit 201.

In step S803, the CPU 3 obtains coordinates of points corresponding to cornea-reflected images Pd and Pe of the light sources 601a and 601b and a pupil center c from the eye image obtained in step S802.

The infrared light emitted from the light sources 601a and 601b illuminates the cornea 611 of the user's eyeball 610. At this time, the cornea-reflected images Pd and Pe formed by some of the infrared light reflected on the surface of the cornea 611 is focused by the light receiving lens 618 and formed into an image on the line-of-sight detection sensor 620, thereby becoming cornea-reflected images Pd' and Pe' in the eye image. Similarly, a light beam from edges a and b of a pupil 612 is also formed into an image on the line-of-sight detection sensor 620, thereby becoming pupil edge images a' and b' in the eye image.

FIG. 7B is a diagram illustrating luminance information (a luminance distribution) of an area α' in the eye image of FIG. 7A. In FIG. 7B, the horizontal direction of the eye image is an X-axis direction and the vertical direction is a Y-axis direction and the luminance distribution in the X-axis direction is illustrated. In the present embodiment, the X-axis direction (horizontal) coordinates of the cornea-reflected images Pd' and Pe' are Xd and Xe, and the X-axis direction coordinates of the pupil edge images a' and b' are Xa and Xb.

As illustrated in FIG. 7B, extremely high levels of luminance are obtained at the coordinates Xd and Xe of the cornea-reflected images Pd' and Pe'. Except for the coordinates Xd and Xe, extremely low levels of luminance are obtained in an area from the coordinate Xa to the coordinate Xb, which corresponds to an area of the pupil 612 (an area of a pupil image obtained by a light beam from the pupil 612 being formed into an image on the line-of-sight detection sensor 620). Then, in an area of an iris 613, which is outside the pupil 612, (an area of an iris image, which is outside the pupil image and is obtained by a light beam from the iris 613 being formed into an image), a luminance that is in the middle of the above-mentioned two types of luminance is obtained. Specifically, in an area whose X-coordinate (coordinate in the X-axis direction) is smaller than the coordinate Xa and an area whose X-coordinate is larger than the coordinate Xb, a luminance that is in the middle of the above-described two types of luminance is obtained.

It is possible to obtain from a luminance distribution such as illustrated in FIG. 7B, the X-coordinates Xd and Xe of the cornea-reflected images Pd' and Pe' and the X-coordinates Xa and Xb of the pupil edge images a' and b'. Specifically, coordinates with extremely high levels of luminance can be obtained as the coordinates of the cornea-reflected images Pd' and Pe', and coordinates with extremely low levels of luminance can be obtained as the coordinates of the pupil edge images a' and b'. Further, when an angle of rotation θx of an optical axis of the eyeball 610 with respect to an optical axis of the light receiving lens 618 is small, the coordinate Xc of a pupil center image c' (the center of the pupil image) obtained by a light beam from the pupil center c being formed into an image on the line-of-sight detection sensor 30 can be expressed as Xc≈(Xa+Xb)/2. That is, it is possible to calculate the coordinate Xc of the pupil center image c' from the X-coordinates Xa and Xb of the pupil edge images a' and b'. In this way, the coordinates of the cornea-reflected images Pd' and Pe' and the coordinate of the pupil center image c' can be estimated.

In step S804, the CPU 3 calculates an image forming magnification β of the eyeball image. The image forming magnification β is a magnification that is determined by the position of the eyeball 610 with respect to the light receiving lens 618 and can be obtained using a function of an interval (Xd−Xe) between the cornea-reflected images Pd' and Pe'.

In step S805, the CPU 3 calculates the angles of rotation of the optical axis of the eyeball 610 with respect to the optical axis of the light receiving lens 618. The X-coordinate of the middle point of the cornea-reflected image Pd and the cornea-reflected image Pe and the X-coordinate of a center of curvature O of the cornea 611 almost coincide. Therefore, when a standard distance from the center of curvature O of the cornea 611 to the center c of the pupil 612 is Oc, the angle of rotation θX of the eyeball 610 in the Z-X plane (plane perpendicular to the Y-axis) can be calculated by the following (Equation 1). An angle of rotation θy of the eyeball 610 in the Z-Y plane (plane perpendicular to the X-axis) can also be calculated by a method that is the same as the method of calculating the angle of rotation θx.

$$\beta \times \bigcirc c \times \mathrm{SIN}\ \theta X \approx \{(Xd+Xe)/2\}-Xc \quad \text{(Equation 1)}$$

In step S806, the CPU 3 uses the angles of rotation θx and θy calculated in step S805 to obtain (estimate) the user's gaze point (a position at the end of the line of sight, the position at which the user is looking) in the image for visual confirmation displayed on the display device 6. If coordinates (Hx, Hy) of the gaze point are the coordinates corresponding to the pupil center c, the coordinates (Hx, Hy) of the gaze point can be calculated by the following (Equation 2) and (Equation 3).

$$Hx = m \times (Ax \times \theta x + Bx) \quad \text{(Equation 2)}$$

$$Hy = m \times (Ay \times \theta y + By) \quad \text{(Equation 3)}$$

The parameter m of (Equation 2) and (Equation 3) is a constant determined by the configuration of the viewfinder optical system (such as the light receiving lens 618) of the camera 1, is a conversion coefficient for converting the angles of rotation θx and θy to the coordinates corresponding to the pupil center c in the image for visual confirmation, and is assumed to be determined in advance and stored in the memory unit 4. The parameters Ax, Bx, Ay, and By are line-of-sight correction parameters that correct for personal differences in the line of sight, are obtained by performing calibration and are assumed to be stored in the memory unit 4 prior to the operation for detecting a line of sight being started.

Calibration is the process of obtaining the user's eye features and is applied for when calculating the coordinates of a gaze point from the angles of rotation. Parameters for correcting sensitivity and a shift in the visual axis are calculated based on an eye image of when the user was made to focus on a plurality of targets. The sensitivity is corrected by the above parameters, Ax and Ay, and the shift in the visual axis is corrected by the above parameters, Bx and By.

In step S807, the CPU 3 stores the coordinates (Hx, Hy) of the gaze point in the memory unit 4 and terminates the operation for detecting a line of sight.

FIG. 9 is a diagram illustrating the distance 32 from the final surface of the ocular optical system to the eye.

The distance 32 from the final surface of the ocular optical system 16 to the eye can be obtained using a function of the coordinates of the cornea-reflected images Pd' and Pe' or an interval between two points. This function is created based on the results of simulations or actual measurements on a real machine.

FIGS. 10A and 10B are diagrams illustrating a method of changing the display area of the display.

The display area in the present embodiment refers to an area in which Organic Light Emitting Diodes (OLEDs) are actually illuminated out of the entire displayable area in which OLEDs are arranged. The display area of the display is changed based on the distance 32 from the final surface of the ocular optical system 16 to the user's eye.

As illustrated in FIG. 10A, the display area is increased when the user's eye is close to the ocular optical system. FIG. 10A illustrates a state in which display is performed using the entire displayable area. In contrast, as illustrated in FIG. 10B, the display area is decreased when the user's eye is far from the ocular optical system. In the present embodiment, it is assumed that the shorter the distance between the user's eye and the ocular optical system, the larger the size of the display area is set to be, and the farther the distance, the narrower the size is set to be. However, it may be switched such that if the distance between the user's eye and the ocular optical system is equal to or less than a predetermined threshold, the display area will be increased (for example, to the entire displayable area), and if the distance is larger than the predetermined threshold, the display area will be made smaller than when the distance is equal to or less than the predetermined threshold. Further, a plurality of such thresholds may be provided so as to change the display area in a stepwise manner before and after the thresholds.

Further, in the present embodiment, when changing the display area of the display, both the OSD (On Screen Display) display and the live view display are changed. It is assumed that the OSD display displays information, such as camera settings at the time of image capturing, which include an aperture and a shutter speed, and the remaining amount of battery.

FIGS. 11A and 11B are diagrams illustrating a change of a display of targets used for calibration (CAL) based on the distance 32 from the final surface of the ocular optical system 16 to the eye.

In the present embodiment, at the time of calibration for line-of-sight detection, the distance 32 from the final surface of the ocular optical system 16 to the eye is measured while the user is looking at a target at the center, and calibration contents are changed based on that distance. In the calibration for line-of-sight detection, the user needs look at a specified plurality of targets for a fixed period of time.

As illustrated in FIG. 11A, if the user's eye is close to the ocular optical system, the arrangement of peripheral targets is changed based on that distance. In the calibration, the larger the image height of the peripheral targets from the optical axis of the ocular optical system 16, the higher the accuracy will be. If the distance 32 from the final surface of the ocular optical system 16 to the eye is short, since the display area that can be stably viewed by the user is broad, the peripheral targets can be arranged diagonally as illustrated in FIG. 11A, which makes it possible to secure the image height of the peripheral targets.

As illustrated in FIG. 11B, if the user's eye is far from the ocular optical system 16, the image height of the peripheral targets is changed so as to be reduced based on that distance. The display area that the user can stably view changes depending on the measured distance 32 from the final surface of the ocular optical system 16 to the eye. For example, if the distance is shorter, the area that can be seen stably will be broader; if the distance is longer, the area that can be seen stably will be smaller. Therefore, placing the peripheral targets in that area makes it possible to ensure that the user looks at the peripheral targets.

FIG. 12 is a flowchart for explaining an operation for changing the display area of the display device. This operation is started by the user turning the power of the camera 1 on in step S1201.

In step S1202, the CPU 3 displays, for example, on the display panel 40, a display asking the user whether to perform calibration.

If the user answers "perform calibration", the CPU 3 advances the process to step S1203 and performs calibration. At this time, the distance 32 from final surface of the ocular optical system 16 to the eye is calculated.

In step S1204, the CPU 3 determines the user-optimized display area of the display based on the distance 32 from the final surface of the ocular optical system 16 to the eye calculated in step S1203.

If the user answers "do not perform calibration" in step S1202, the CPU 3 advances the process to step S1205. In step S1205, the CPU 3 reads out the display area determined when the calibration was previously performed. At this time, the user needs to select user-specific calibration data.

In step S1206, the CPU 3 determines the display area based on the display area read out in step S1205.

In step S1207, the CPU 3 actually changes the display area of the display device 6 based on the determined display area.

As described above, in the present embodiment, in an electronic device, a display area of a display unit is changed based on a distance from the final surface of an ocular optical system to an eye. Specifically, the display area is larger when the distance is shorter, and the display area is smaller when the distance is longer. Thus, without troublesome setting or the like, it is possible to display an image in a display area that is optimal for the user.

Further, in the present embodiment, the distance from the final surface of the ocular optical system to the eye is calculated using cornea-reflected images. It is possible to calculate the distance from the final surface of the ocular optical system to the eye based on the coordinates of the cornea-reflected images of an image obtained by a line-of-sight detection sensor. Thus, as compared with a configuration in which a line-of-sight detection means and a distance calculation means are provided separately, since a means for calculating a distance is not specifically needed, it is possible to prevent the device from becoming complex and increasing in size, which makes it possible to have a more inexpensive configuration.

Further, in the present embodiment, at the time of calibration for line-of-sight detection, the display of targets used for calibration is changed according to the distance from the final surface of the ocular optical system to the eye. This allows for greater calibration certainty and effectiveness compared to a configuration that does not change the display of the targets used for calibration according to the distance from the final surface of the ocular optical system to the eye. Therefore, it is expected that stability and accuracy of line-of-sight detection will improve.

Further, in the present embodiment, when changing the display area of the display, both the OSD display and the live view display are changed. Thus, visibility can be ensured not only in the live view display but also in the OSD display as compared with a configuration in which only the live view display is changed and the OSD display is kept constant. Therefore, it is easier for the user to ascertain information, such as camera settings and remaining amount of battery at the time of image capturing.

Further, in the present embodiment, the distance from the final surface of the ocular optical system to the eye is calculated at the time of calibration for line-of-sight detection. Thus, once a user-specific distance has been obtained and recorded, from the next and subsequent times, it is possible to easily read out the display area optimized for the user only by selecting the calibration data. Therefore, the user can quickly transition to image capturing.

Second Embodiment

Hereinafter, a second embodiment will be described with reference to FIGS. 13A and 13B.

In the first embodiment, when changing the display area of the display, both the OSD display and the live view display are changed. In contrast, in the second embodiment, when changing the display area, only the live view display is changed and the OSD display is maintained at a constant.

Figure 13A:
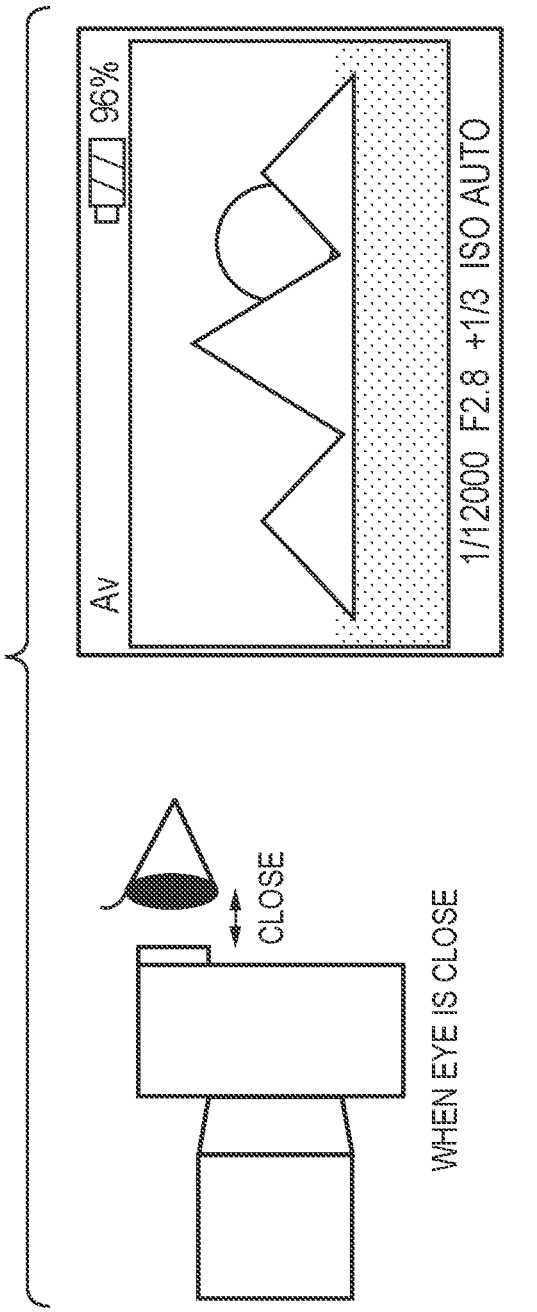
FIGS. 13A and 13B are schematic diagrams illustrating how to change the display area of the display device in a second embodiment.
Figure 13B:
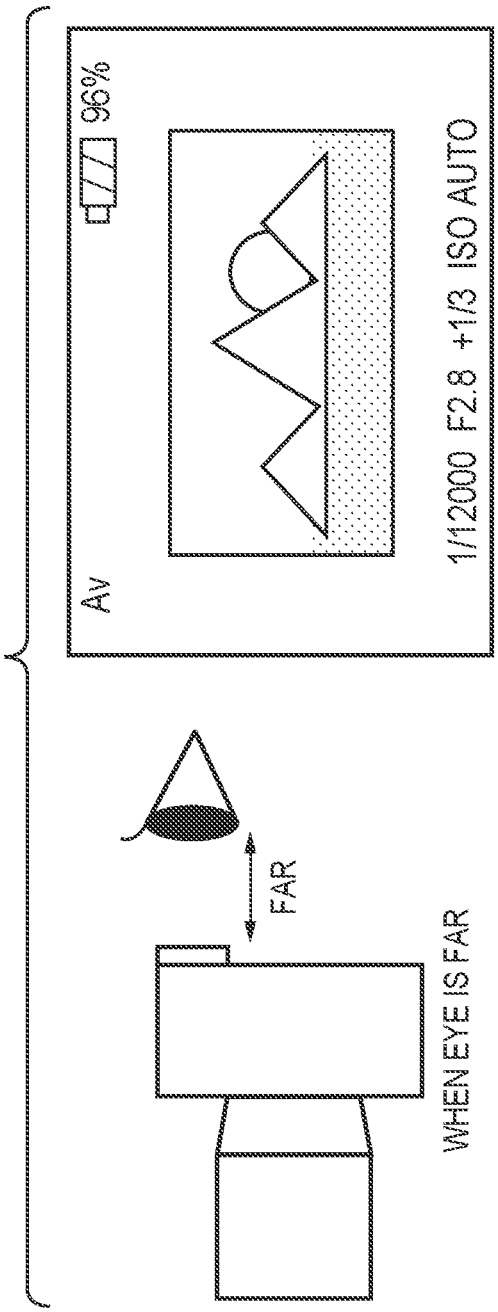

FIG. 13A illustrates a case where the eye is close to the ocular optical system. FIG. 13B illustrates a case where the eye is far from the ocular optical system.

In this embodiment, the OSD display is constant regardless of the distance of the eye from the camera and only the display area of the live view display is changed. Thus, compared with the configuration in which both the OSD display and the live view display are changed, it is possible to prevent the fonts of characters indicating information, such as camera settings and the remaining amount of battery, from becoming small and difficult to see, while ensuring visibility of the live view display.

Third Embodiment

Hereinafter, a third embodiment will be described with reference to FIG. 14.

In the first embodiment, the distance 32 from the final surface of the ocular optical system 16 to the eye is calculated at the time of calibration for line-of-sight detection. In contrast, in the third embodiment, the distance is calculated after the approach of the eye is detected.

Figure 14:
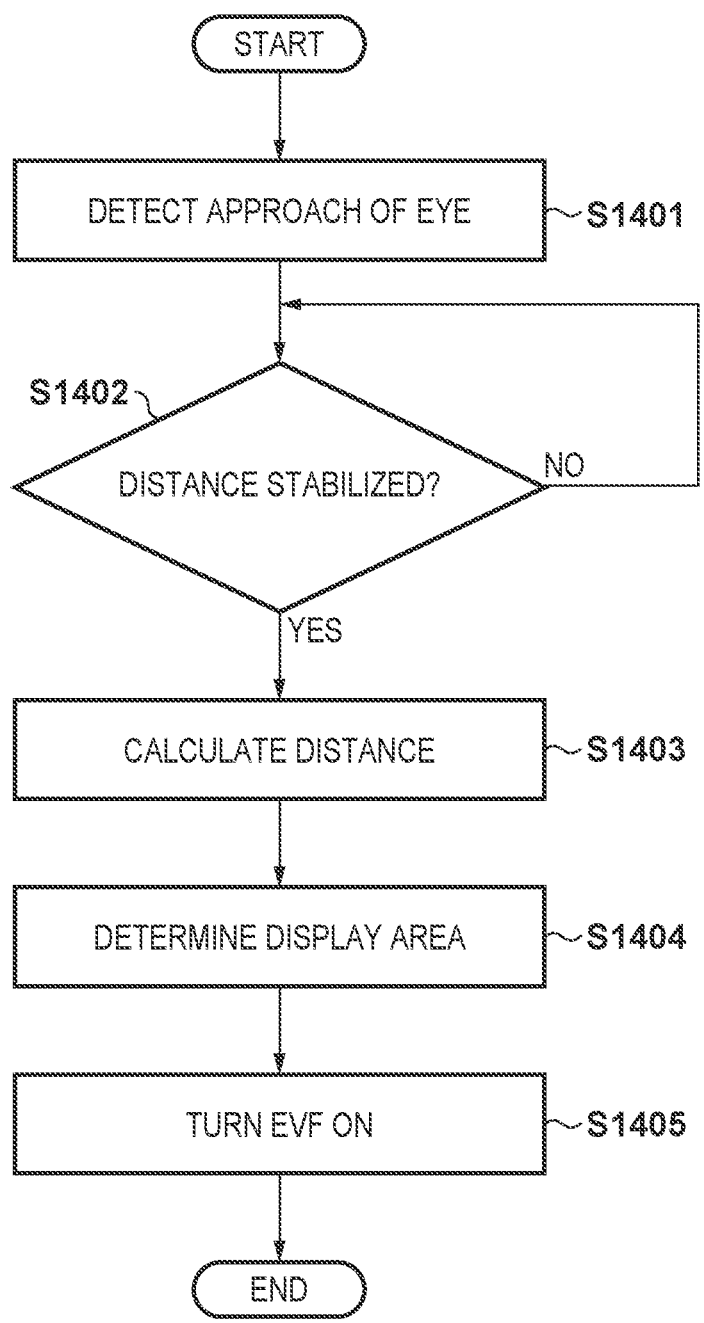
FIG. 14 is a flowchart for explaining an operation for changing the display area of the display device in a third embodiment.

In step S1401 of FIG. 14, the CPU 3 detects the approach of the eye using the eye-approach detection unit 208.

In step S1402, the CPU 3 determines whether or not the distance from the final surface of the ocular optical system 16 to the eye has stabilized. Here, the CPU 3 determines whether or not the amount of reflected light received by the eye-approach detection sensor 50 is stable exceeding an eye-approach determination threshold. If the amount of reflected light is stable exceeding the eye-approach determination threshold, it is determined that the distance has stabilized, and the CPU 3 advances the process to step S1403. On the other hand, if the amount of reflected light has not exceeded the eye-approach determination threshold or is not stable, the CPU 3 determines that the distance is not stable and repeats the process of step S1402 until the distance stabilizes.

In step S1403, the CPU 3 calculates the distance from the final surface of the ocular optical system 16 to the eye.

In step S1404, the CPU 3 determines the display area of the display based on the distance calculated in step S1403.

In step S1404, the CPU 3 turns the display on based on the display area determined in step S1405.

In the present embodiment, the distance from the final surface of the ocular optical system to the eye is calculated after it is detected that the user's eye has approached the camera. Thus, since the distance is calculated for each instance of the approach of the eye and the display area is changed, display can be performed with the display area optimized for the way the user is looking into the viewfinder at each instance.

Fourth Embodiment

A fourth embodiment will be described below with reference to FIG. 15.

In the first embodiment, the distance 32 from the final surface of the ocular optical system 16 to the eye is calculated at the time of calibration for line-of-sight detection. In contrast, in the fourth embodiment, the distance is calculated when a press of a button for changing the display area of the display is detected. In the present embodiment, it is assumed that the front surface of the camera body 1B is provided with the button for changing the display area of the display.

In step S1501 of FIG. 15, the CPU 3 detects a press of the button for changing the display area of the display.

In step S1502, the CPU 3 calculates the distance 32 from the final surface of the ocular optical system 16 to the eye.

In step S1503, the CPU 3 determines the display area of the display based on the distance calculated in step S1502.

In step S1504, the CPU 3 changes the display area of the display based on the display area determined in step S1503.

In the present embodiment, when a press of the button for changing the display area of the display is detected, the distance from the final surface of the ocular optical system to the eye is calculated. Thus, it is possible to calculate the distance again and perform display with an appropriate display area when the user wishes to change the display area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-181436, filed Nov. 5, 2021, which is hereby incorporated by reference herein in its entirety.

What is claimed is:

1. An electronic device comprising:
a display configured to display an image;
an ocular optical system configured to view the display; and
at least one processor or circuit configured to function as
a control unit configured to control the display so as to change a display area of the display,
wherein in a case where a distance from the ocular optical system to an eye of a user looking into the ocular optical system is a first distance, the control unit sets the display area to a first size, and in a case where the distance from the ocular optical system to the eye is a second distance that is longer than the first distance, the control unit sets the display area to a second size that is smaller than the first size.

2. The electronic device according to claim 1, wherein the control unit changes the display area in a stepwise manner in accordance with the distance from the ocular optical system to the eye.

3. The electronic device according to claim 1, wherein the at least one processor or circuit is configured to further function as an obtaining unit configured to obtain the distance from the ocular optical system to the eye.

4. The electronic device according to claim 3, wherein the obtaining unit obtains the distance from the ocular optical system to the eye, using an image of a reflection in a cornea of the eye.

5. The electronic device according to claim 4, wherein using the image of the reflection in a cornea of the eye comprises determining the coordinates of feature points of the eye in the image of the reflection in a cornea.

6. The electronic device according to claim 3, wherein the at least one processor or circuit is configured to further function as: a line-of-sight detection unit configured to detect a line of sight, wherein the obtaining unit obtains the distance from the ocular optical system to the eye at a time of calibration of the line-of-sight detection unit.

7. The electronic device according to claim 6, wherein the line-of-sight detection unit changes a display of a target that is used for calibration based on the distance from the ocular optical system to the eye.

8. The electronic device according to claim 3, wherein in a case where it is detected that a user's eye has approached the ocular optical system, the obtaining unit obtains a distance from the ocular optical system to the eye.

9. The electronic device according to claim 3, wherein in a case where the display area of the display has been changed, the obtaining unit obtains the distance from the ocular optical system to the eye.

10. The electronic device according to claim 1, wherein in a case of changing the display area of the display, the control unit changes the display area of both an OSD display and a live-view display.

11. The electronic device according to claim 1, wherein in a case of changing the display area of the display, the control unit changes only a live-view display and maintains a display area of an OSD display to be constant.

12. The electronic device according to claim 1, further comprising: an image capture device configured to capture an image.

13. A method of controlling an electronic device including a display configured to display an image and an ocular optical system configured to view the display, the method comprising:
controlling the display so as to change a display area of the display, wherein
in the controlling, in a case where a distance from the ocular optical system to an eye of a user looking into the ocular optical system is a first distance, the display area is set to a first size, and in a case where the distance from the ocular optical system to the eye is a second distance that is longer than the first distance, the display area is set to a second size that is smaller than the first size.

14. A non-transitory computer-readable storage medium storing a program for causing a computer to execute the method of controlling an electronic device including a display configured to display an image and an ocular optical system configured to view the display, the method comprising:
- controlling the display so as to change a display area of the display, wherein
- in the controlling, in a case where a distance from the ocular optical system to an eye of a user looking into the ocular optical system is a first distance, the display area is set to a first size, and in a case where the distance from the ocular optical system to the eye is a second distance that is longer than the first distance, the display area is set to a second size that is smaller than the first size.

* * * * *